US009635976B1

(12) United States Patent
Charles

(10) Patent No.: US 9,635,976 B1
(45) Date of Patent: May 2, 2017

(54) FASTENER FOR SECURING LIDS TO POTS AND PANS

(71) Applicant: Keith Charles, Fort Worth, TX (US)

(72) Inventor: Keith Charles, Fort Worth, TX (US)

( * ) Notice: Subject to any disclaimer, the term of this patent is extended or adjusted under 35 U.S.C. 154(b) by 236 days.

(21) Appl. No.: 13/961,598

(22) Filed: Aug. 7, 2013

Related U.S. Application Data

(60) Provisional application No. 61/681,213, filed on Aug. 9, 2012.

(51) Int. Cl.
*A47J 36/10* (2006.01)

(52) U.S. Cl.
CPC .................... *A47J 36/10* (2013.01)

(58) Field of Classification Search
CPC ...... A47J 36/10; Y10T 24/314; Y10T 24/316; Y10T 16/44; B65D 51/242; B65D 23/003; B65D 25/22; B65D 25/28; B65D 25/30
USPC .... 292/288, 246, 249, 253, 254, 256, 256.6, 292/256.65, 258, 289, 259 R, DIG. 11, 292/DIG. 16; 220/315, 318, 912, 319, 220/320, 323, 324, 573.1, 287, 754, 756, 220/760, 212.5, 751, 768, 752; D7/393, D7/360, 387, 394, 601; 215/279, 280, 215/273, 286, 287, 290, 291, 293; 206/805, 150; 294/27.1, 33, 165, 87.2, 294/87.1, 166, 148; D24/199
See application file for complete search history.

(56) References Cited

U.S. PATENT DOCUMENTS

| | | | | | |
|---|---|---|---|---|---|
| 1,348,963 | A | * | 8/1920 | Schafer | A47J 36/10 292/259 R |
| 3,133,665 | A | * | 5/1964 | Colhouer | 220/318 |
| D241,600 | S | * | 9/1976 | Ashton | 220/322 |
| 4,086,947 | A | * | 5/1978 | Payne | 152/175 |
| 4,413,851 | A | * | 11/1983 | Ritter | 292/259 R |
| D388,657 | S | * | 1/1998 | Bacharowski | D7/387 |
| 5,997,793 | A | * | 12/1999 | Lahnala | 264/261 |
| D479,947 | S | * | 9/2003 | Claypool | D7/393 |
| D493,665 | S | * | 8/2004 | Warning | D7/393 |
| 7,103,944 | B2 | * | 9/2006 | Johnson | 24/300 |
| 7,775,348 | B2 | * | 8/2010 | Olsen | B65D 71/504 206/150 |
| D630,887 | S | * | 1/2011 | Olivari | D7/393 |
| 2002/0153378 | A1 | * | 10/2002 | Bianco et al. | 220/315 |
| 2003/0186024 | A1 | * | 10/2003 | Walsh | 428/100 |
| 2008/0078824 | A1 | * | 4/2008 | Spriegel | B65D 81/3876 229/403 |
| 2008/0245680 | A1 | * | 10/2008 | Olsen | B65D 71/504 206/150 |
| 2010/0271825 | A1 | * | 10/2010 | Black et al. | 362/267 |

FOREIGN PATENT DOCUMENTS

FR    2621563 A1 *   4/1989

* cited by examiner

*Primary Examiner* — Alyson M Merlino
(74) *Attorney, Agent, or Firm* — Law Office of Jeff Williams; J. Oliver Williams

(57) ABSTRACT

An elastically deformable fastener is configured to secure a lid to a pot. The fastener includes a body having a first retaining member and a second retaining member. The first retaining member receives a first pot handle and the second retaining member receives a second pot handle.

10 Claims, 4 Drawing Sheets

FASTENER FOR SECURING LIDS TO POTS AND PANS

BACKGROUND

1. Field of the Invention

The present application relates generally to fasteners, and more particularly, to fasteners for securing lids to pots and/or pans.

2. Description of Related Art

Pots typically include a lip for receiving a lid thereon, which in turn retains the temperature and prevents exposure of the contents carried within the pot. In some cases, the lip has shown to be an ineffective means to secure the lid, for example, during car transit on rough terrain.

A conventional method to secure the lid includes manually securing the pot with one hand while retaining the lid with the other. However, this process could possibly result in spilling and/or physical harm.

Although conventional methods are effective in some scenarios, considerable shortcomings remain.

DESCRIPTION OF THE DRAWINGS

The novel features believed characteristic of the present application are set forth in the appended claims. However, the fastener itself, as well as a preferred mode of use, and further objectives and advantages thereof, will best be understood by reference to the following detailed description when read in conjunction with the accompanying drawings, wherein:

Figure 1:
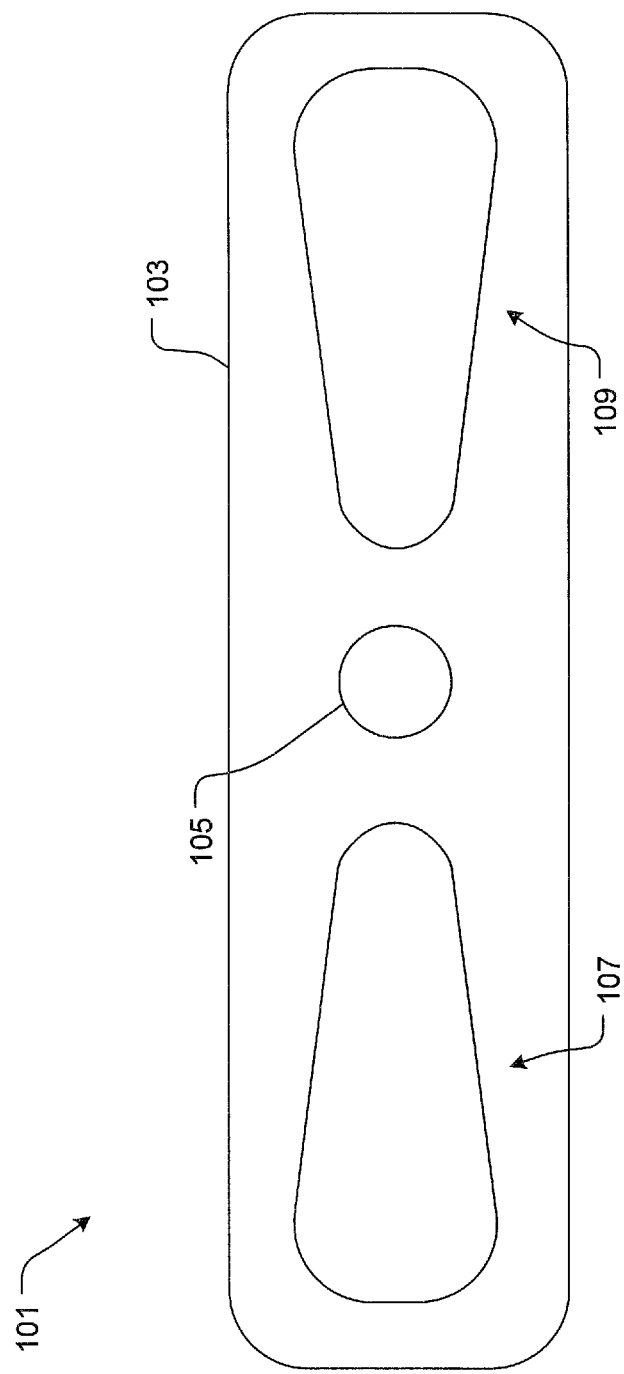
FIG. 1 is a top view of a fastener according to the preferred embodiment of the present application.

While the fastener and method of use disclosed in the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the fastener are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The fastener of the present application overcomes common disadvantages associated with securing a lid to a pot. In particular, the fastener includes retaining means for receiving one or more handles associated the pot and/or lid. When assembled, the fastener is retained by the handles and is adapted to elastically stretch over and secure the lid to the pot. The fastener is further optionally provided with one or more retaining means to receive and secure with the lid handle. Further detailed description of these features is discussed below and shown in the corresponding figures.

The fastener and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
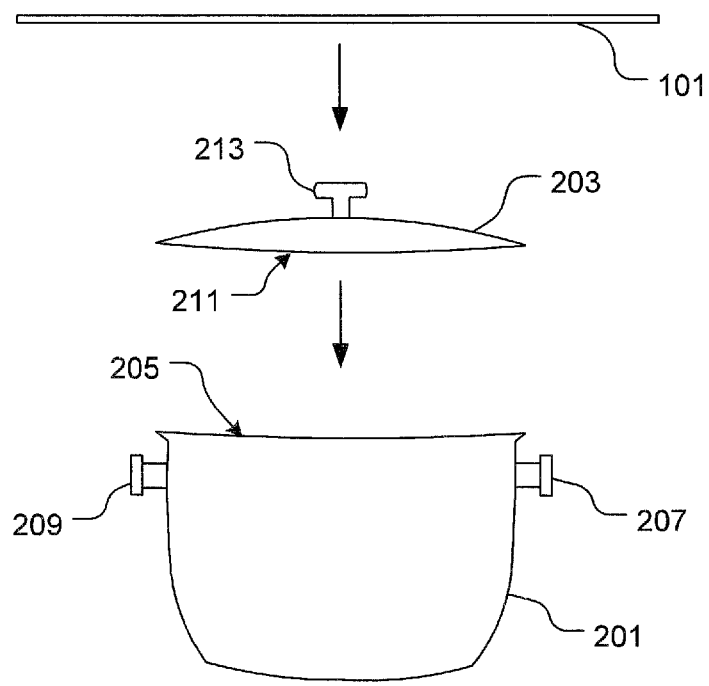
FIGS. 2 and 3 are side views of the fastener of FIG. 1 shown operably associated with a conventional lid and pot.
Figure 3:
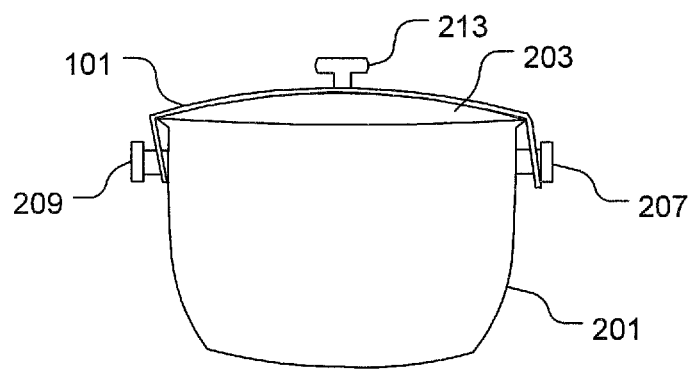

Referring now to the drawings wherein like reference characters identify corresponding or similar elements throughout the several views, FIGS. 1-3 depict a fastener 101 in accordance with a preferred embodiment of the present application. The figures depict fastener 101 operably associated with a conventional pot 201 and a lid 203. In FIG. 1, a top view of fastener 101 is shown, while FIGS. 2 and 3 depict fastener 101 retaining lid 203 to pot 201.

In the contemplated embodiment, fastener 101 preferably includes three retaining members for securing lid 203 to pot 201. It will be appreciated that fastener 101 could include more or less retaining members having the same or different configurations than shown in the preferred embodiment. During use, the retaining members are adapted to secure to handles, knobs, and the like associated with the lid and/or the pot or pan. Although shown associated with a pot, it will be appreciated that fastener 101 is configured to secure also to other types of lids and containers having knobs, handles, and the like.

Fastener 101 preferably comprises of a body 103 having one or more retaining members, in particular, a center cutout 105 and two opposing cutouts 107 and 109. The three cutouts 105, 107, and 109 are configured to extend through the thickness of body 103 and are uniquely shaped to effectively receive one or more handles, knobs, and/or other means associated with lifting and handling pot 201 and/or lid 203.

In the exemplary embodiment, body 103 has generally rectangular profile with rounded corners; cutout 105 has a generally circular profile; and cutouts 107 and 109 form isosceles triangles with rounded corners, preferably at a minimum of 0.5 inch radius, where the vertex points of the isosceles triangles face each other. It should be appreciated that alternative embodiments of fastener 101 could include a body and/or retaining members with different geometric profiles, some being configured to match a handle or attachment devices associated with lid 203 and and/or pot 201. For example, a longitudinal center cutout could be utilized to match a linear longitudinal handle of a lid.

Body 103 is preferably composed of an elastically deformable material capable of stretching and thereafter returning back to the original form. In the preferred embodiment, fastener 101 is composed of a translucent material that complies with FDA regulations under 21 C.F.R. §177.2600, in particular, FDA High Strength Silicone Rubber preferably with a service temperature within the range of −50 to 450 degrees Fahrenheit. The elastomeric material preferable has a minimum tensile strength of 1200 pounds per square inch; a Shore A Durometer between 40-50; 500-1000 percent elongation capability; and 200-250 pounds per inch tear strength. These features allow sufficient stretching of body 103, while also enabling the material to return back to the original form and to allow effective friction and compressive contact between body 103 and lid 203 and/or pot 201.

Referring specifically to FIGS. 2 and 3, fastener 101 is shown securing lid 203 to pot 201. Pot 201 includes a lip 205, a first side handle 207, and a second side handle 209. Lid 203 is provided with an edge 211 that is received by lip 205 and a handle 213.

After lid 203 is placed on pot 201, fastener 101 is utilized to retain the lid thereon so as to prevent separation. In particular, cutout 109 receives handle 207, center cutout receives lid handle 213, and cutout 107 receives handle 209. As shown, the elastic stretching of body 103 provides effective means to secure lid 203 to pot 201.

Figure 4:
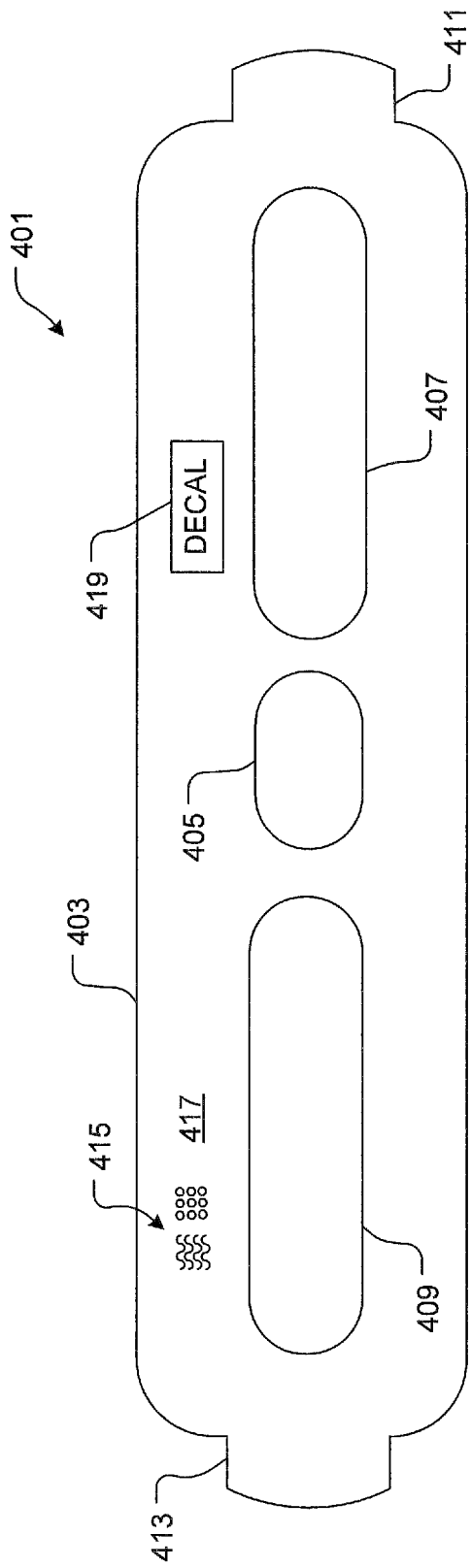
FIGS. 4 and 5 are top views of fasteners according to alternative embodiments of the present application.

Referring next to FIG. 4, a top view of an alternative embodiment of fastener 101 is shown. Fastener 401 is substantially similar in form and function to fastener 101, and the features discussed herein with respect to fastener 401 could easily be incorporated with fastener 101, and vice-versa.

Fastener 401 comprises of a body 403 having three retaining members: a center cutout 405 and two opposing side cutouts 407 and 409. Like fastener 101, these retaining members are operably associated with handles and/or other attachment members of lid 203 and/or pot 201. Fastener 401 is further provided with two tabs 411 and 413 integrally attached to and protruding from body 403. These tabs provide user convenient means for attaching and removing fastener 401 from pot 201 and/or various types of pans. In the exemplary embodiment, tabs 411 and 413 are positioned at opposing ends of body 403; however, it will be appreciated that tabs 411 and 413 may be positioned at other desired locations.

Fastener 401 is further provided with one or more surface treatments 415, for example, grooves, indented or upraised dimples, and/or other surface treatments for adding additional surface friction and compression on surface 417. A decal 419 could be either disposed within body 403 or on surface 417 for providing warnings, instructions, and/or advertisement.

Figure 5:
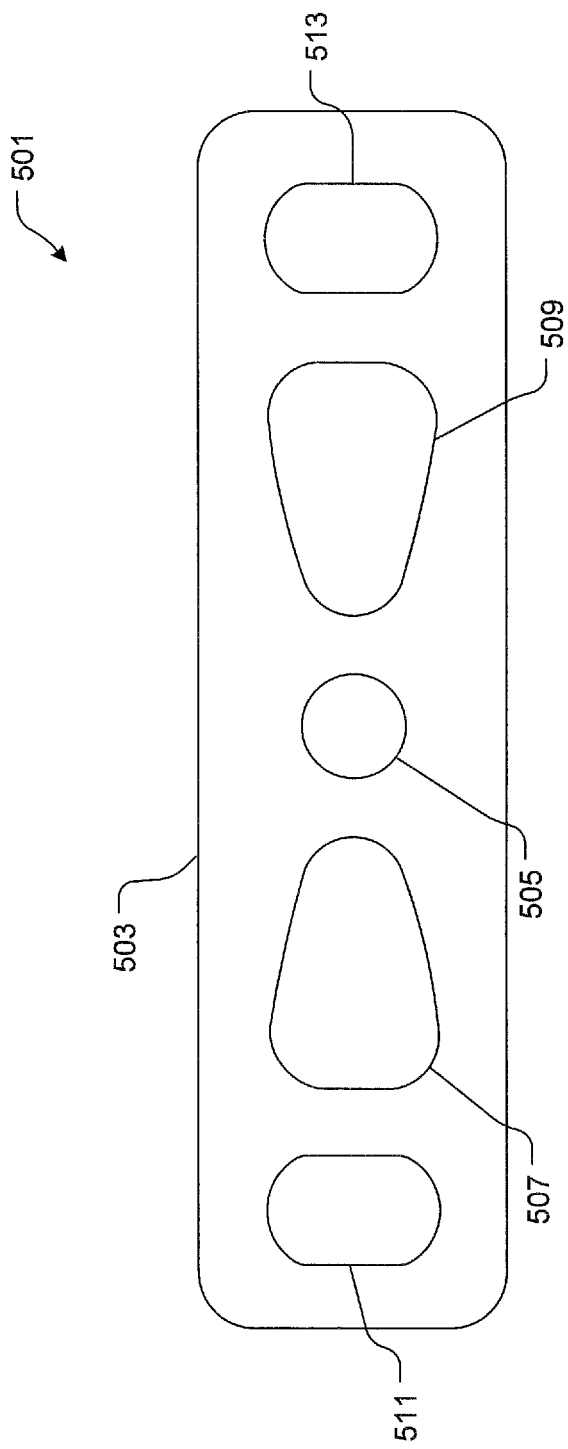

Referring next to FIG. 5, a top view of an alternative embodiment of fastener 101 is shown. Fastener 501 is substantially similar in form and function to fasteners 101 and 401, and the features discussed herein with respect to these fasteners could easily be incorporated with fastener 501, and vice-versa.

Fastener 501 comprises of a body 503 having five retaining members: a center cutout 505, two opposing side cutouts 507 and 509 substantially similar to cutouts 407 and 409, and two additional cutouts 511 and 513. Like fasteners 101 and 401, these retaining members are operably associated with handles and/or other attachment members of lid 203 and/or pot 201. One unique feature believed characteristic of fastener 501 is the ability to secure to different sized pots having handles at different locations relative to the lip. As such, additional cutouts are utilized in the preferred embodiment; however, it will be appreciated that alternative embodiments could include more or less cutouts.

In the contemplated embodiment, cutout 505 has a circular shape, cutouts 507 and 509 have triangular shapes with rounded corners, and cutouts 509 and 511 have rectangular shapes with rounded corners. However, it will be appreciated that alternative embodiments could include various shapes and sizes in lieu of the preferred embodiment for securing to the attachment means associated with the lid and/or pot.

It is apparent that a fastener with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An elastic fastener in combination with a pot having a lid, the elastic fastener, comprising:
   an elongated body having:
      a first retaining member configured to receive a first handle of the pot;
      a second retaining member configured to receive a second handle of the pot;
      a center cutout extending through the elongated body and configured to receive a handle of the lid;
      a third retaining member positioned between the first retaining member and the center cutout; and
      a fourth retaining member positioned between the second retaining member and the center cutout;
   wherein when the first handle of the pot is received in the first retaining member and the second handle of the pot is received in the second retaining member, the elongated body is elastically stretched over the lid so as to apply a compression force against the lid, which in turn securely retains the lid to the pot; and
   wherein the third retaining member and the fourth retaining member have rounded triangular shapes where rounded vertex points of the rounded triangular shapes face each other, the third retaining member and the fourth retaining member being larger than the first and the second retaining members.

2. The fastener of claim 1, wherein the center cutout is circular.

3. The fastener of claim 1, wherein the first retaining member and the second retaining member are cutouts extending through the elongated body.

4. The fastener of claim 1, wherein the elongated body is composed of a translucent material.

5. The fastener of claim 1, wherein the elongated body is composed of silicone rubber.

6. The fastener of claim 1, wherein the elongated body is composed of material having a service temperature within the range between negative 50 degrees Fahrenheit and 450 degrees Fahrenheit.

7. The fastener of claim 1, wherein the elongated body is composed of material having a minimum tensile strength of 1200 pounds per square inch.

8. The fastener of claim 1, wherein the elongated body is composed of material having a Shore A Durometer between 40-50.

9. The fastener of claim 1, wherein the elongated body is composed of material having 500 to 1000 elongation percentage.

10. The fastener of claim 1, wherein the elongated body is composed of material having 200-250 pounds per inch tear strength.

\* \* \* \* \*